United States Patent
Johanson et al.

[11] Patent Number: 6,105,273
[45] Date of Patent: *Aug. 22, 2000

[54] AGITATED BED COOLING, DRYING, OR HEATING APPARATUS

[75] Inventors: Russell W. Johanson, Ramsey; Roger A. Davis, Delano, both of Minn.; Virgil J. Macaluso, Independence, Kans.; Joel J. Phillippi, Edina, Minn.

[73] Assignee: Cat-Tec Industries, Inc., Eden Prairie, Minn.

[*] Notice: This patent is subject to a terminal disclaimer.

[21] Appl. No.: 09/229,954

[22] Filed: Jan. 13, 1999

Related U.S. Application Data

[63] Continuation-in-part of application No. 08/959,621, Oct. 28, 1997, Pat. No. 5,893,217.

[51] Int. Cl.[7] ........................................ F26B 3/34
[52] U.S. Cl. .................... 34/267; 34/392; 34/401
[58] Field of Search ........................ 34/267, 380, 381, 34/392, 401, 90, 164, 166; 207/352, 359, 250; 198/609, 630, 952

[56] References Cited

U.S. PATENT DOCUMENTS

| | | | |
|---|---|---|---|
| 2,428,090 | 9/1947 | Naeher et al. | 34/266 |
| 2,498,218 | 2/1950 | Nielsen | 34/164 |
| 3,966,032 | 6/1976 | McWilliams et al. | 34/164 X |
| 4,180,718 | 12/1979 | Hanson | 34/164 X |
| 4,305,210 | 12/1981 | Christensen et al. | 34/164 X |
| 5,037,537 | 8/1991 | Bielagus | 209/382 |
| 5,392,529 | 2/1995 | Bailey et al. | 34/164 X |
| 5,537,757 | 7/1996 | Gray | 34/164 |
| 5,557,858 | 9/1996 | Macaluso et al. | 34/273 |
| 5,893,217 | 4/1999 | Johanson et al. | 34/266 |
| 5,908,115 | 6/1999 | Govoni et al. | 209/359 |
| 6,003,244 | 12/1999 | Johanson et al. | 34/267 |

*Primary Examiner*—Stephen Gravini
*Attorney, Agent, or Firm*—Hovey, Williams, Timmons & Collins

[57] ABSTRACT

An agitated bed apparatus (20) for heating, cooling, and/or drying particulate material (152) is provided which includes a housing (22) having an elongated flexible bed (24) therein adapted to receive the material (152). An agitator assembly (26) made up of a series of rotatable beater bar units (70) is located below the bed (24) and oriented for repeatedly impacting the bed (24) to establish an undulating bed movement for elevation and tumbling of the particulate material (152). A material conditioning unit (156) such as an infrared heating unit array (28) is located above the bed (24) so as to expose the particulate material (152) to hot, cool, or ambient air for heating, drying, or cooling thereof. In another embodiment, the apparatus (20) includes a plurality of units (156) which are slidably removable from the housing (22) of the apparatus (20).

21 Claims, 7 Drawing Sheets

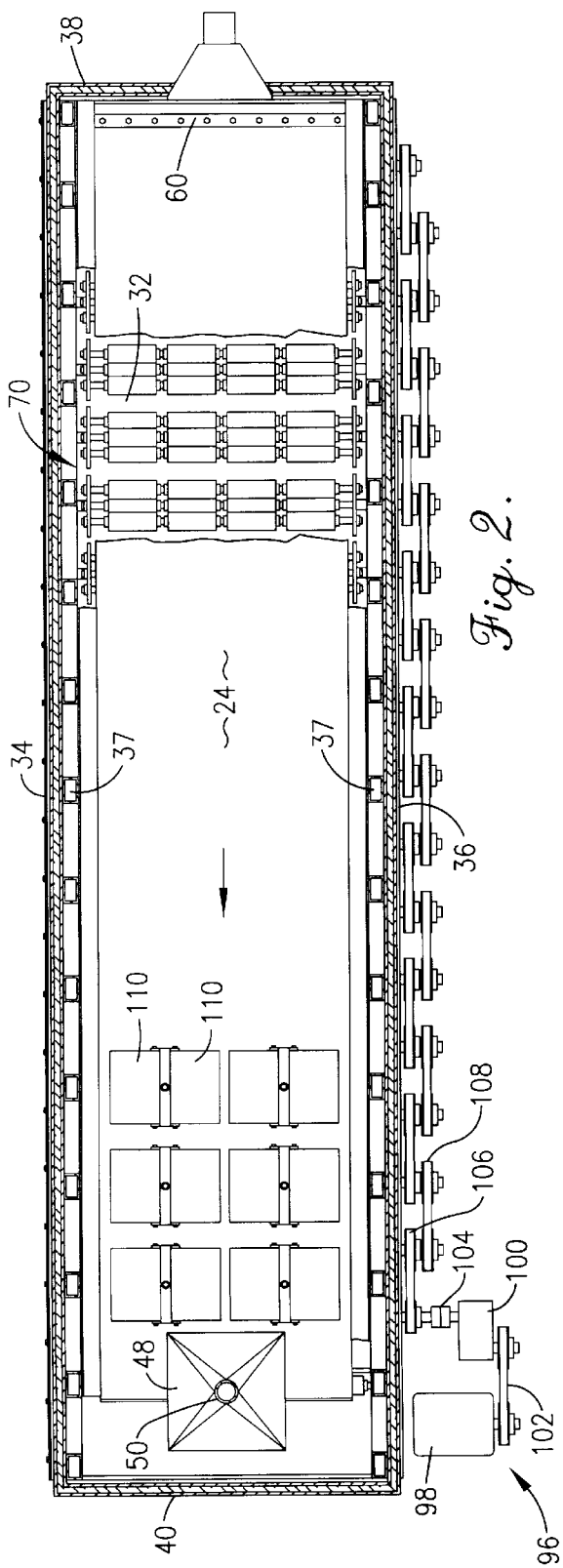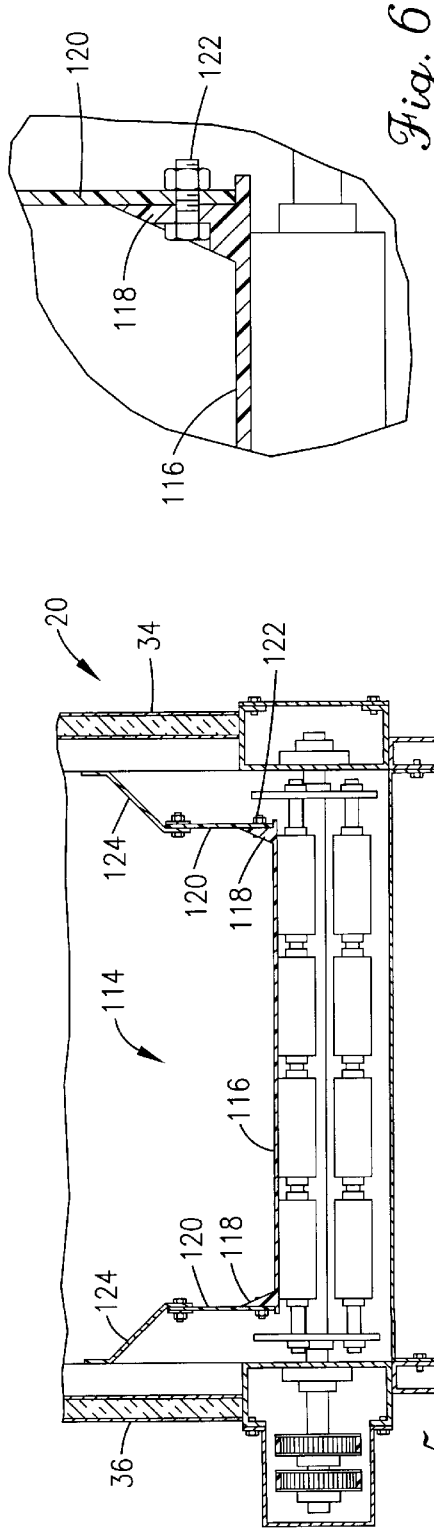

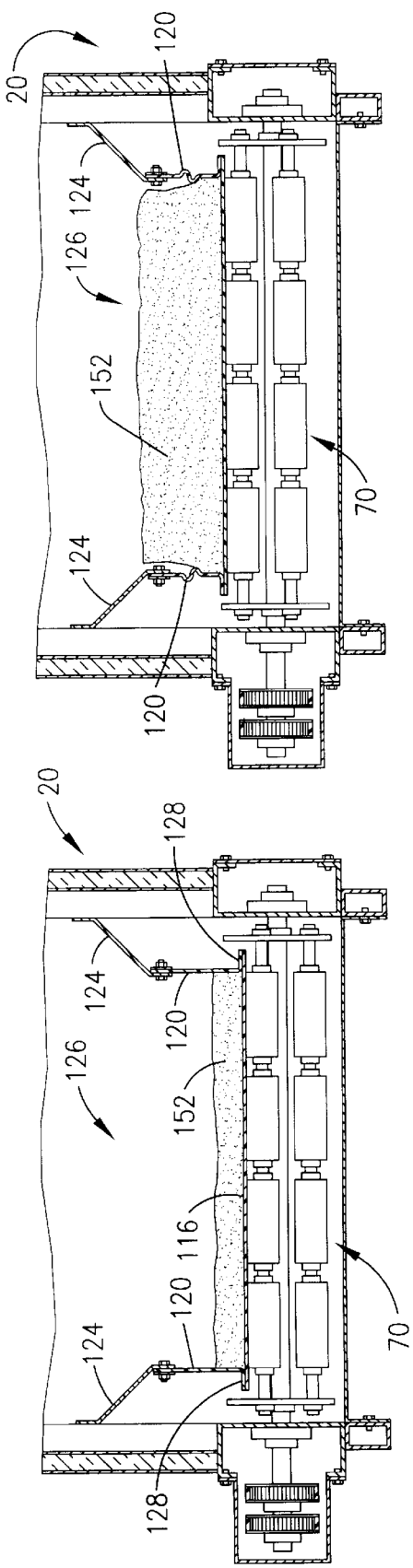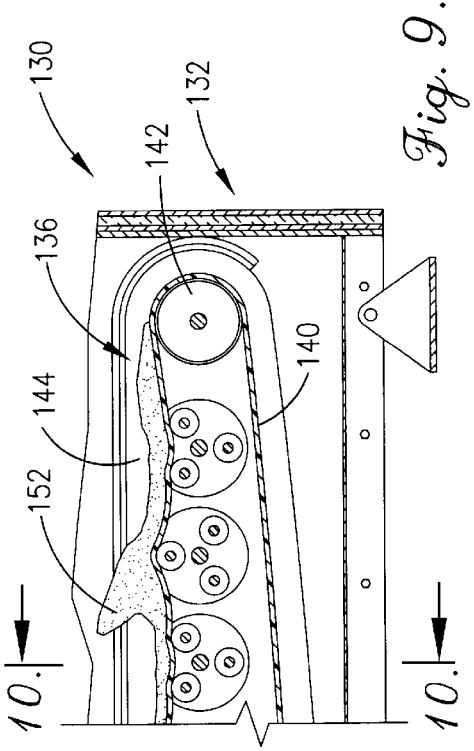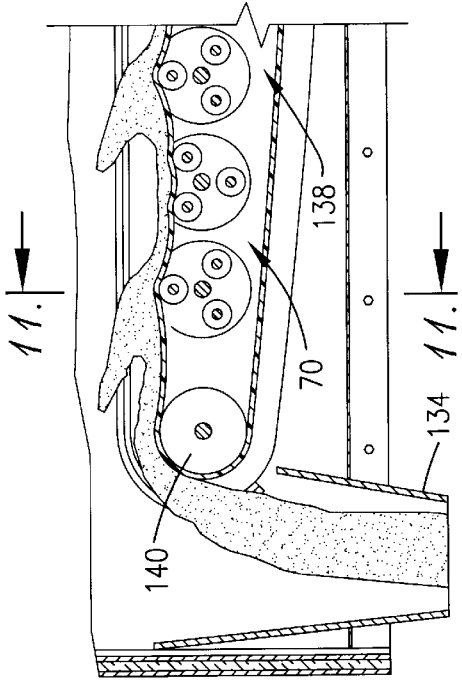

AGITATED BED COOLING, DRYING, OR HEATING APPARATUS

RELATED APPLICATIONS

This application is a continuation in part of U.S. patent application Ser. No. 08/959,621 filed Oct. 28, 1997 now U.S. Pat. No. 5,893,217.

BACKGROUND OF THE INVENTION

1. Field of the Invention

The present invention is broadly concerned with improved agitated bed apparatus having material conditioning units comprising a component selected from the group consisting of heating, drying, and/or cooling devices. Such beds can be used for the heating, drying, and cooling of an almost limitless number of particulate products. More particularly, the invention pertains to such apparatus wherein a flexible bed which is preferably essentially imperforate is provided together with a series of agitators located below and spaced along the length of the bed and oriented for repeatedly impacting the bed in order to generate an undulating bed movement serving to elevate and tumble the particulate material. A number of material conditioning units are disposed above the bed for directing air (hot, cool, or ambient) onto the particulate material as it is being elevated and tumbled. This creates a most efficient drying or cooling environment. In one embodiment, the units are slidably removable from the housing of the apparatus and thus can be selected based upon the particular application.

2. Description of the Prior Art

A vast number of drying devices have been proposed in the past for processing particulate materials. Among these are the well known drum dryers which have long been used for drying alfalfa and other agricultural products. A constant goal in the development of dryers is the most efficient drying of particulates, i.e., in the shortest time and with the smallest energy inputs.

U.S. Pat. No. 5,557,858 describes an infrared drying apparatus made up of an infrared radiant energy source adjacent a series of stacked, looped conveyor belts for handling particulate material. The use of flameless catalytic gas fired infrared heaters in this context has proven to be a decided advance in the art.

Canadian Patent No. 993,259 describes an apparatus for treating seeds through the use of IR radiation wherein the seeds are supported on a perforate steel wedge-wire conveyor allowing passage of air through the conveyor. As noted in the '259 patent, the nature of the metal conveyor used in conjunction with the wavelength of the IR radiation are vital factors in obtaining good results.

U.S. Pat. No. 5,037,537 describes a size classification device used for separating fines from wood chips. In this device, a perforate or foraminous bed is employed together with a series of rotatable beater bar units underlying the bed. Fines are allowed to pass through the bed and are collected below, thus effecting separation of the fines from the larger wood particles. Use of perforated beds as described in the '537 U.S. and '259 Canadian patents has been found to be troublesome. In particular, particulates tend to clog the openings thus defeating the very purpose of providing a perforated bed. Moreover, the beds described in the '537 patent are believed to have short useful lives because the beater bar units tend to tear and destroy the bed.

SUMMARY OF THE INVENTION

The present invention overcomes the problems outlined above and provides a greatly improved agitator-type apparatus useful for heating, cooling, and/or drying particulate matter. The apparatus of the invention broadly includes an elongated housing presenting a particulate material inlet, and a spaced material outlet, together with structure for exit of moisture from the housing. An elongated flexible bed is located within the housing and extends between the inlet and the outlet. Preferably, the bed is essentially imperforate. The bed presents an upper particulate material supporting surface, an opposed lower surface, and a pair of side margins. The overall bed assembly further has an upstanding skirt member adjacent each of the side margins, with the bed and skirt members cooperatively retaining the particulate material during heating and drying thereof. A series of agitators are located below and spaced along the length of the bed and are oriented for repeatedly impacting the lower surface of the bed in order to generate an undulating bed movement serving to elevate and tumble the particulate material on the bed and to move the material along the length thereof from the inlet to the outlet.

Finally, a number of material conditioning units are disposed above the bed within the housing. The units comprise a component selected from the group consisting of heating devices, cooling devices, drying devices, and mixtures thereof, for heating, cooling, and/or drying the particulate material as it is elevated and tumbled. Preferably, the conditioning units utilized within the agitated bed apparatus of the invention are slidably removable from the apparatus so that the user can select the proper energy source for a particular application, thus allowing one agitated bed apparatus to serve multiple purposes. For example, a number of conditioning units having infrared heaters can be positioned above the bed for directing IR energy onto the particulate material as it is being elevated and tumbled. Other energy alternatives for use in the units include steam coils, radiant heat sources, water chillers, direct burners, recirculated air, electric heating elements, and any other heat transferor or heat exchanger.

In one form of the invention, the bed is mounted within the housing substantially in tension and against translational movement. In this embodiment, one end of the bed is preferably fixedly secured to the housing, whereas the other end is yieldably attached through the use of a spring or the like. Alternately, the bed may be in the form of an endless, essentially imperforate belt trained about endmost rollers.

The agitators are advantageously provided along substantially the entire length of the bed and are in the form of respective, rotatable, multiple-roller beater bar assemblies. A variable speed drive is advantageously coupled with the beater bar assemblies for rotation thereof at different rotational speeds at the discretion of the operator.

The skirt members forming a part of the bed can be constructed in a number of ways so long as the particulate material-retaining function thereof is preserved. In one embodiment, the marginal ends of the flexible bed are turned upwardly and secured to connectors affixed to the housing sidewalls. Alternately, upstanding, elongated lengths of cloth material (preferably sail cloth) are affixed to the bed margins, with the upper ends of the cloth material lengths being supported by connectors secured to the housing walls. In the case of a continuous belt bed, the cloth skirt members are supported above the upper run of the belt and lie on the upper run.

In order to provide desirable operational flexibility, the housing is preferably provided with means for adjusting the inclination of the bed. Generally, a degree of inclination of plus or minus 6° from horizontal is sufficient, and this can be readily accommodated by a conventional jacking screw arrangement. Also, positive pressure ambient air can be introduced into the housing to assist in drying of the particulates.

BRIEF DESCRIPTION OF THE DRAWINGS

FIG. 2 is a sectional view taken along lines 2—2 of FIG. 1 and further illustrating the construction of the preferred drying apparatus;

FIG. 5 is a vertical sectional view illustrating another drying apparatus in accordance with the invention in particularly showing a modified bed and skirt design;

FIG. 6 is an enlarged fragmentary sectional view depicting the interconnection between the bed and flexible skirt members in the FIG. 5 embodiment;

FIG. 7 is a vertical sectional view similar to that of FIG. 5, but showing another bed and skirt design wherein flexible skirts are stitched to the bed and at a location where an agitator is in its lowered position;

FIG. 8 is a vertical sectional view similar to that of FIG. 7 and showing the FIG. 7 design at a location where an agitator is in its uppermost position;

FIG. 9 is a fragmentary side view in vertical section illustrating another embodiment of the invention making use of an endless belt flexible bed;

DETAILED DESCRIPTION OF THE PREFERRED EMBODIMENT

Figure 1:
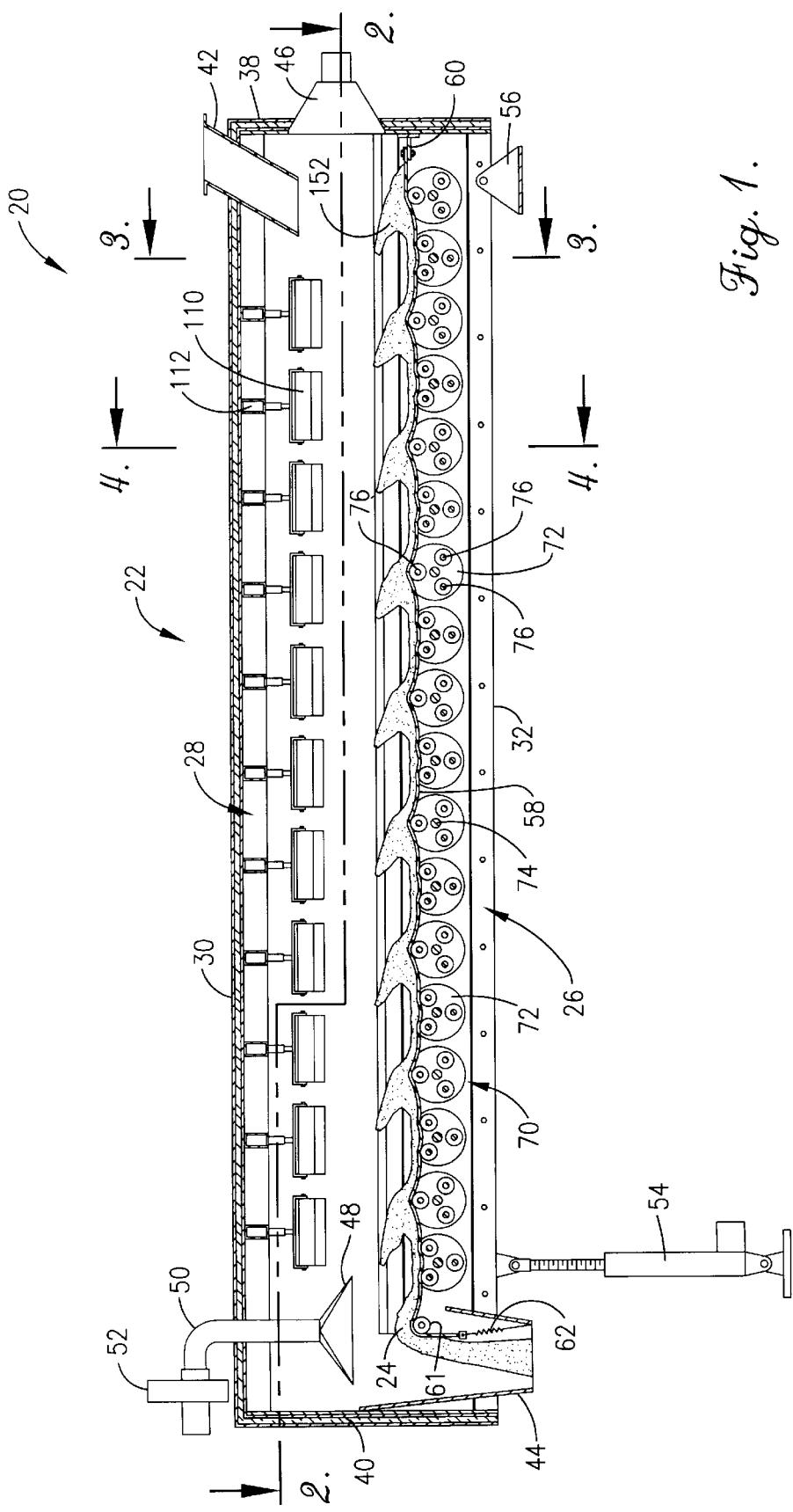
FIG. 1 is a side view in partial vertical section illustrating the construction of a preferred agitated bed infrared drying apparatus in accordance with the invention.

Turning now to the drawings, and particularly FIGS. 1–2, an agitated bed drying apparatus 20 in accordance with the invention is illustrated. Broadly speaking, the apparatus 20 includes an elongated housing 22, a flexible elongated bed 24 within the housing 22, an agitator assembly 26 beneath bed 24, and an infrared drying array 28 within the housing 22 and above the bed 24.

In more detail, the housing 22 includes elongated top, bottom and sidewalls 30, 32, 34 and 36, together with end walls 38 and 40. As shown, all of the walls 30–40 are insulated, save for bottom wall 32. In order to provide extra strength, the sidewalls 34, 36 and top wall 30 include axially spaced apart, box-type, interconnected frame members 37. The housing 22 is equipped with a particulate material inlet 42 adjacent end wall 38, as well as a chute-type material outlet 44 proximal to the opposed end wall 40. An air handling system is provided with housing 22 and includes an inlet manifold 46 extending through end wall 38 above the bed 24, as well as an exhaust hood 48 adjacent outlet 44; the hood 48 is coupled with an exit pipe 50, the latter having an exhaust fan 52 interposed therein. A best seen in FIG. 1, a conventional jacking screw 54 is affixed to the outlet end of housing 22, while the inlet end thereof is pivotally supported via pivot mount 56. Thus, the inclination of the bed 24 can be selectively altered by manipulation of the jacking screw 54.

The bed 24 in the FIG. 1 embodiment is made up of an elongated length of flexible material 58 which extends the full length of housing 22 as shown. In the embodiment illustrated, bed 24 is essentially imperforate. However, bed 24 can be formed of a material having holes therethrough for allowing air to pass through the bed in applications where this is desirable. Any holes in bed 24 should be small enough to prevent the passage of particulate material therethrough. The inlet end of the material 58 is fixedly secured to end wall 38 by means of fastener bar 60. The opposed outlet end of the material 58 is trained over and idler 61 and is yieldably attached to outlet 44 by means of a spring 62. In this fashion, the material 58 is maintained substantially in tension throughout the use of apparatus 20 and against any significant translational movement.

Figure 3:
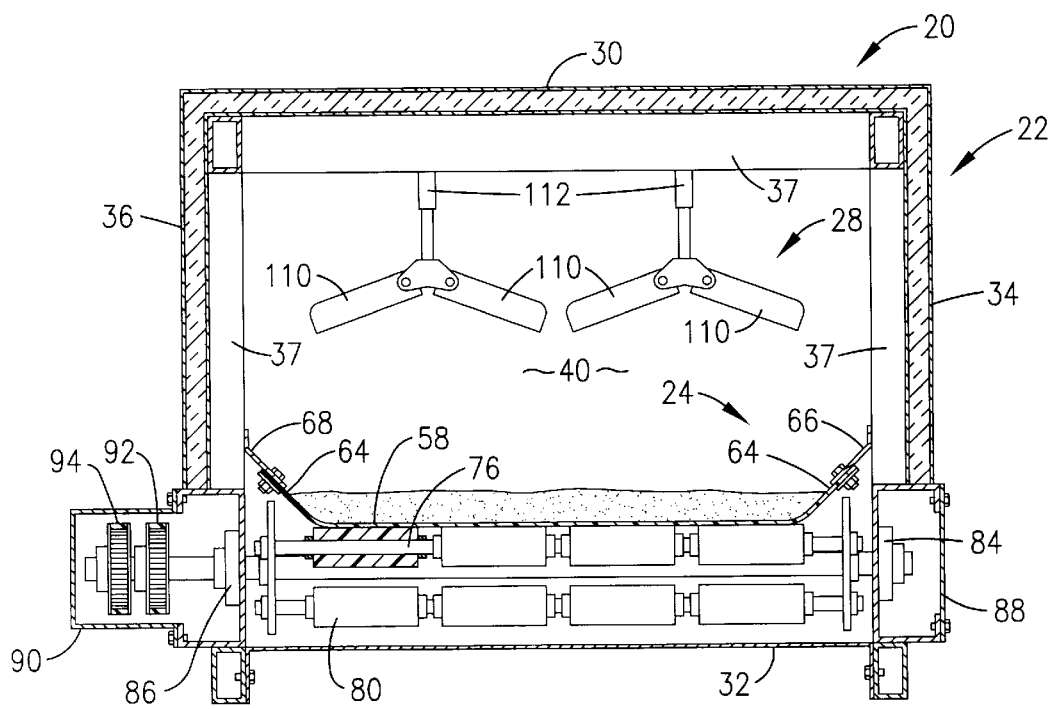
FIG. 3 is a vertical sectional view taken along lines 3—3 of FIG. 1 and depicting the operation of the drying apparatus at a region thereof where a bed agitator is in its lower position.
Figure 4:
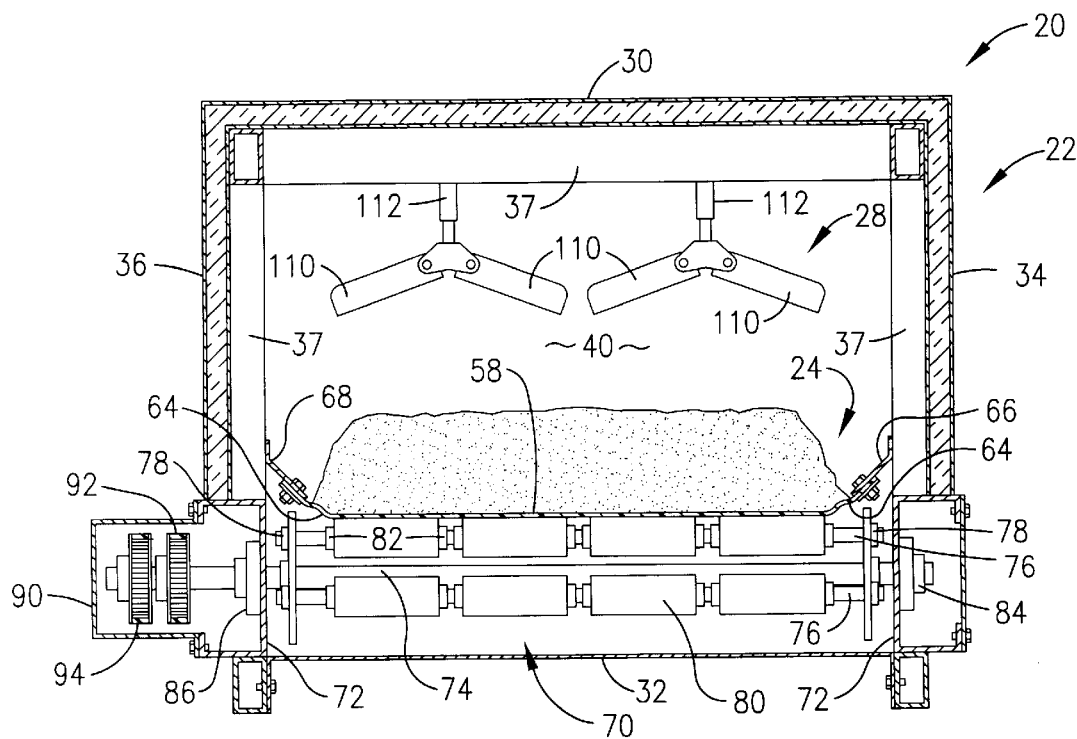
FIG. 4 is a vertical sectional view taken along the lines 4—4 of FIG. 1 and depicting the operation of the drying apparatus at a region thereof where a bed agitator is in its upper position to elevate and tumble the particulate material dried.

Referring to FIGS. 3 and 4, it will be seen that the side marginal edges 64 of the material 58 are secured to and supported by respective, elongated, obliquely oriented metallic connector elements 66 affixed to the upright frame members 37. Thus, the connector elements 68 and margins 64 cooperatively define upright skirt members associated with the bed 24 in order to retain particulate material on the bed during drying operations.

The agitator assembly 26 is made up of a series of elongated, transversely extending, axially spaced, multiple-bar rotatable beater bar units 70. The individual units 70 are identical and each includes a pair of circular end plates 72 together with an elongated central drive shaft 74 extending the full length of the unit 70 through the end plates 72. Each unit 70 further has a total of three roller bars 76 circumferentially and evenly spaced about the shaft 74 at 120° intervals. Each of the bars 76 is fixed to the plates 72 by set collars 78. As best viewed in FIGS. 3 and 4, each bar 76 supports a plurality, here four, of elongated, annular, rotatable synthetic resin rollers 80. These rollers 80 are coaxially mounted on the corresponding bars 76 and are rotatable relative thereto by means of roller end bearings 82.

All of the units 70 are driven for powered rotation during operation of apparatus 20. Again referring to FIGS. 3 and 4, it will be seen that the ends of drive shaft 74 are respectively received within bearings 84 and 86; the bearings 84 are located within an elongated bearing housing 88, whereas the bearings 86 are disposed within an opposed, elongated drive housing 90. The central drive shaft 74 of the unit 70 extends into the confines of drive housing 90 and support a pair of conventional drive belt pulleys 92 and 94.

A drive assembly 96 is provided for the agitator assembly 26 in order to effect rotation of the individual units 70. The assembly 96 has a variable speed motor 98 coupled to a reducer 100 via belt 102. The reducer is in turn connected by means of coupler 104 to the drive shaft 74 of the drive unit closest to outlet 44. This drive shaft is then connected to the adjacent drive shaft 74 through a drive belt 106. Alternating drive belts 108 respectively trained about adjacent pairs of drive pulleys 94 and 92 are employed for rotating all of the units 70, as will be readily apparent from a consideration of FIG. 2. Use of the variable speed motor 98 permits rotation of the beater bar unit 70 at different rotational speeds at the discretion of the user.

The units 70 are positioned relative to bed 24 so that, upon rotation thereof, each of the sets of rollers 80 of each unit successively impacts the underside of the flexible bed 24. This generates an undulating bed movement which serves to elevate and tumble the particulate material to be dried on bed 24. This action is best illustrated in FIGS. 1, 3 and 4. In FIG. 3 the position of a unit 70 is illustrated wherein two of the rollers sets thereof are essentially parallel. In this orientation only a minimum amount of deflection of the bed 24 is occurring. In contrast (see FIG. 4) as the unit 70 is further rotated a roller set moves to its uppermost position, thereby more substantially deflecting the bed 24. This causes the material atop bed 24 to be elevated and tumbled in an arcuate and generally forward direction towards outlet 44. In essence, when each unit 70 moves between the FIG. 3 and FIG. 4 position, a vertical component of motion is imparted to the bed 24.

The infrared drying array 28 is made up of a number of infrared heaters 110 which are arranged in pairs, with each pair being supported by a mount 112 extending downwardly from top wall 30. The heater pairs extend essentially the fall length of housing 22 between inlet 42 and hood 48. These heaters are themselves conventional, and are of a type described in U.S. Pat. No. 5,557,858, which is incorporated by reference herein. Generally speaking, the infrared heaters 110 are designed for emitting infrared radiation having a wavelength of from about 0.5–12 microns and more preferably from about 3–7 microns. The operating temperature of these units is typically on the order of from about 700–900° F.

FIGS. 5 and 6 illustrate a modified bed 114 for use in the apparatus 20. The bed 114 includes an elongated, resilient synthetic resin belt-like element 116 having side marginal upstands 118. A pair of elongated, fore and aft extending flexible cloth elements 120 are secured to the upstands 118 by means of bolt fasteners 122 (see FIG. 6). The upper ends of the cloth elements 122 are supported by elongated, metallic, obliquely oriented connectors 124 affixed to the housing sidewalls 34, 36. In this embodiment, the cloth elements 120 present skirt members for the bed 114. The connectors 124 assist in the skirting function, and also are designed for directing infrared energy from the heaters 110 to the particulate material on bed 114.

FIGS. 7 and 8 illustrate the use of yet another bed 126 in the apparatus 20. In this case the bed 126 is made up of the belt-like member 116 with upstanding cloth elements 120 affixed to the member 16 by longitudinal stitching lines 128. As in the previous embodiment, the upper ends of the elements 120 are supported by the sidewall mounted connectors 124. As shown in FIG. 8, when the individual beater bar units 70 are in their uppermost position for elevating and tumbling the particulate material being dried, the cloth elements 120 fold as necessary to accommodate movement of the bed 126.

Figure 10:
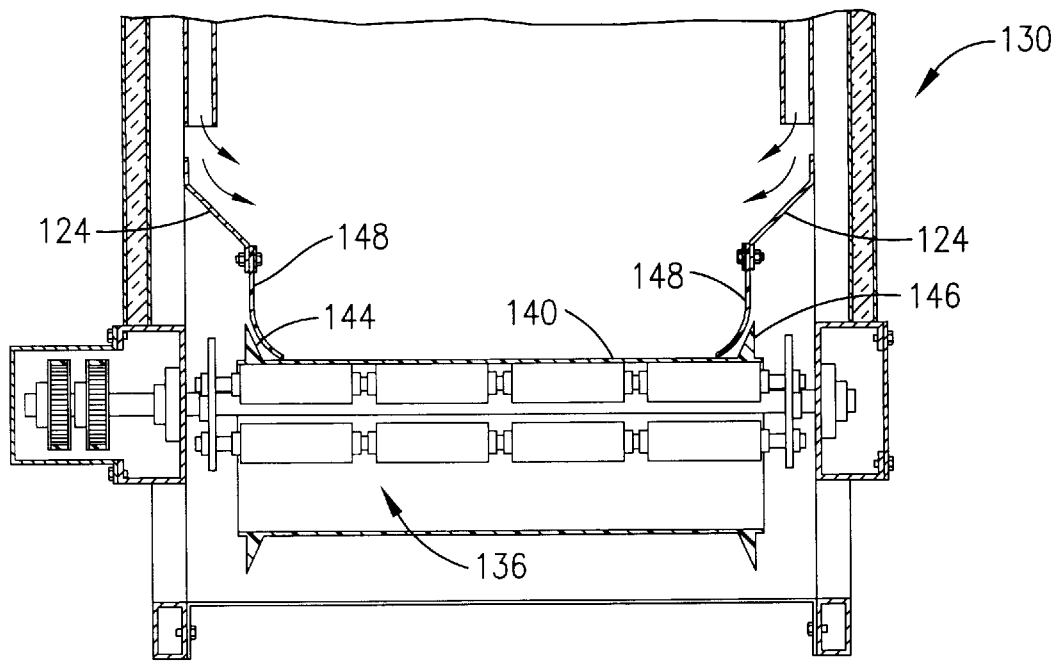
FIG. 10 is a vertical sectional view taken along line 10—10 of FIG. 9 and depicting the FIG. 9 embodiment at a location where an agitator is in its lowered position.
Figure 11:
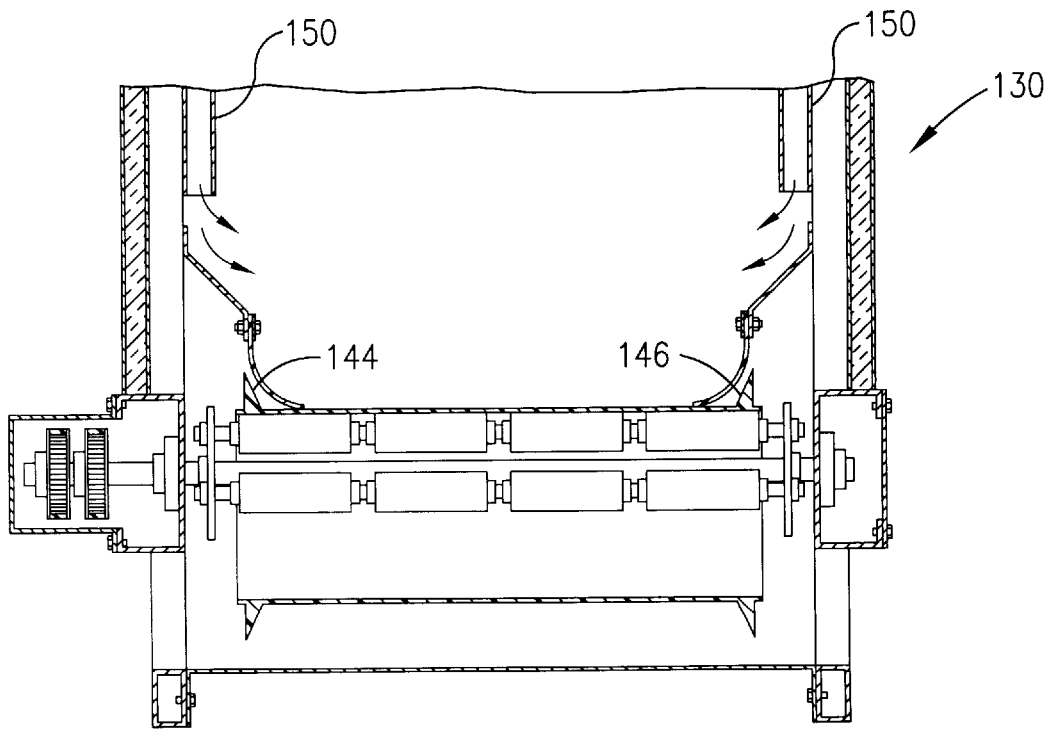
FIG. 11 is a vertical sectional view taken along the line 11—11 of FIG. 9 and depicting the FIG. 9 embodiment at a location where an agitator is in its upper position for elevating and tumbling particulate material.

FIGS. 9–11 illustrate another drying apparatus 130 which in many respects is similar to apparatus 24. Thus, the overall apparatus 130 includes an insulated housing 132 having a material inlet (not shown) and a chute-type material outlet 134. A bed 136 is located within the housing 132, along with an agitator assembly 138 and an infrared drying array (not shown). In the case of apparatus 130, however, the bed 136 is in the form of an elongated, endless belt 140 which is trained around endmost rollers 140 and 142. Typically, the roller 140 is powered by a conventional drive so as to continuously move the belt 140.

The agitator assembly 138 is made up of a series of transversely extending, axially spaced apart beater bar units 70, as in the case of the FIG. 1 embodiment. Similarly, these units 70 are driven for rotation by the same type of drive assembly 96 previously described, and the apparatus 130 has an infrared drying array of the same character as the FIG. 1 embodiment.

FIGS. 10 and 11 illustrate in more detail the bed 36 and particularly the skirting arrangement employed. In particular, the belt 140 includes a pair of outwardly projecting, continuous marginal cleats 144, 146. These cleats cooperate with a pair of upright cloth elements 148 which are located with their bottom ends inboard of the cleats 144, 146 and lying atop the upper run of the belt 140. As can be appreciated, the cloth elements 148 and cleats 144, 146 cooperatively define a particulate material-retaining skirt member adjacent each marginal edge of the bed 136. The upper ends of the cloth elements 148 are supported on oblique connectors 124 previously described.

The apparatus 130 differs in one additional respect from the earlier embodiments. In this unit, a series of sidewall mounted, depending, open bottom, spaced apart air tubes 150 are mounted adjacent the inner surfaces of the housing sidewalls and are coupled to a source of ambient pressurized air (not shown). Thus, during drying operations, pressurized air is directed downwardly and is diverted by the connectors 124 onto the particulate material on the belt 140.

While all of the foregoing embodiments demonstrate the use of infrared heaters 110 as the energy source, it will be appreciated that the agitated bed apparatus could be designed so that all or part of the heaters 110 are replaced with some other heating or cooling source, such as electric heating elements or water chillers.

The operation of all of the foregoing embodiments will be readily understood from the drawings and the preceding discussion. Generally speaking however, and referring to the FIG. 1 embodiment as an example, particulate material 152 is fed through inlet 42 onto bed 24 during rotation of the agitator assembly 26 and while the array 28 is operating. The particulate material 152 on the bed is successively moved along the length thereof through the action of the beater bar units 70. As each of the roller sets of the respective units 70 rotates to its maximum uppermost position, the bed 24 is deflected upwardly. This causes the material directly above on the bed 24 to be elevated and tumbled generally in a direction towards outlet 44. As illustrated in FIG. 1, this action of the agitator assembly 26 causes a "rolling" action serving to expose the particulate material 152 to the radiation from the array 28. As the material 152 advances along the bed 24, it ultimately passes through chute outlet 44 for recovery as a dried product. During this time, positive pressure ambient air may be directed into the housing 22 through manifold 46, while moisture-laden air is exhausted through hood 48. In this fashion, the ambient atmosphere within housing 22 is maintained relatively dry to assist in processing of the material 152.

As shown in FIGS. 9–11, it is also possible to equip the dryers of the invention with forced air inlet tubes for directing ambient air towards the particulate material carried on the bed. This provides a further evaporative drying effect.

Figure 12:
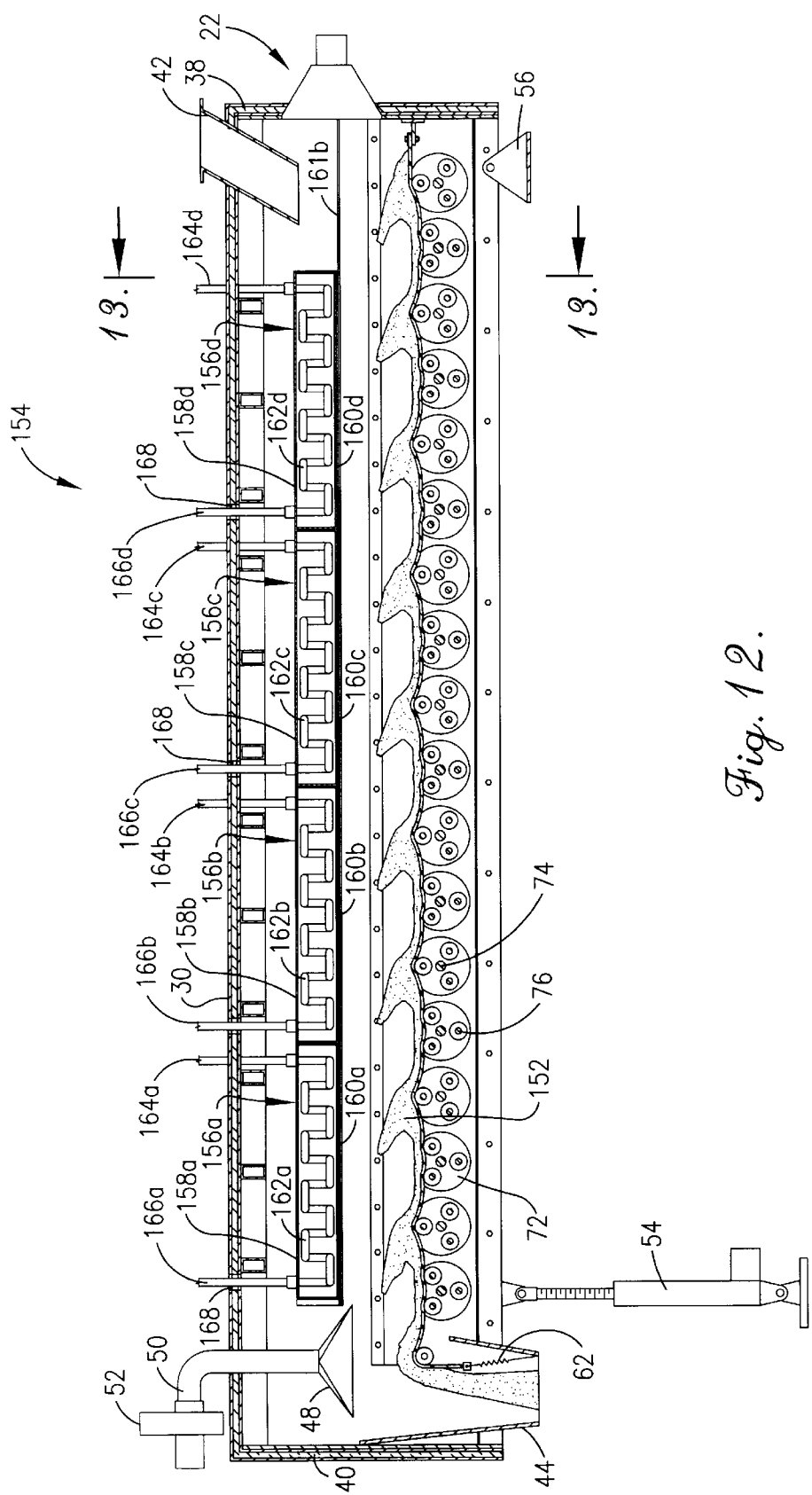
FIG. 12 is a side view in partial vertical section illustrating the construction of an agitated bed having removable steam coil units in accordance with one embodiment of the invention.
Figure 13:
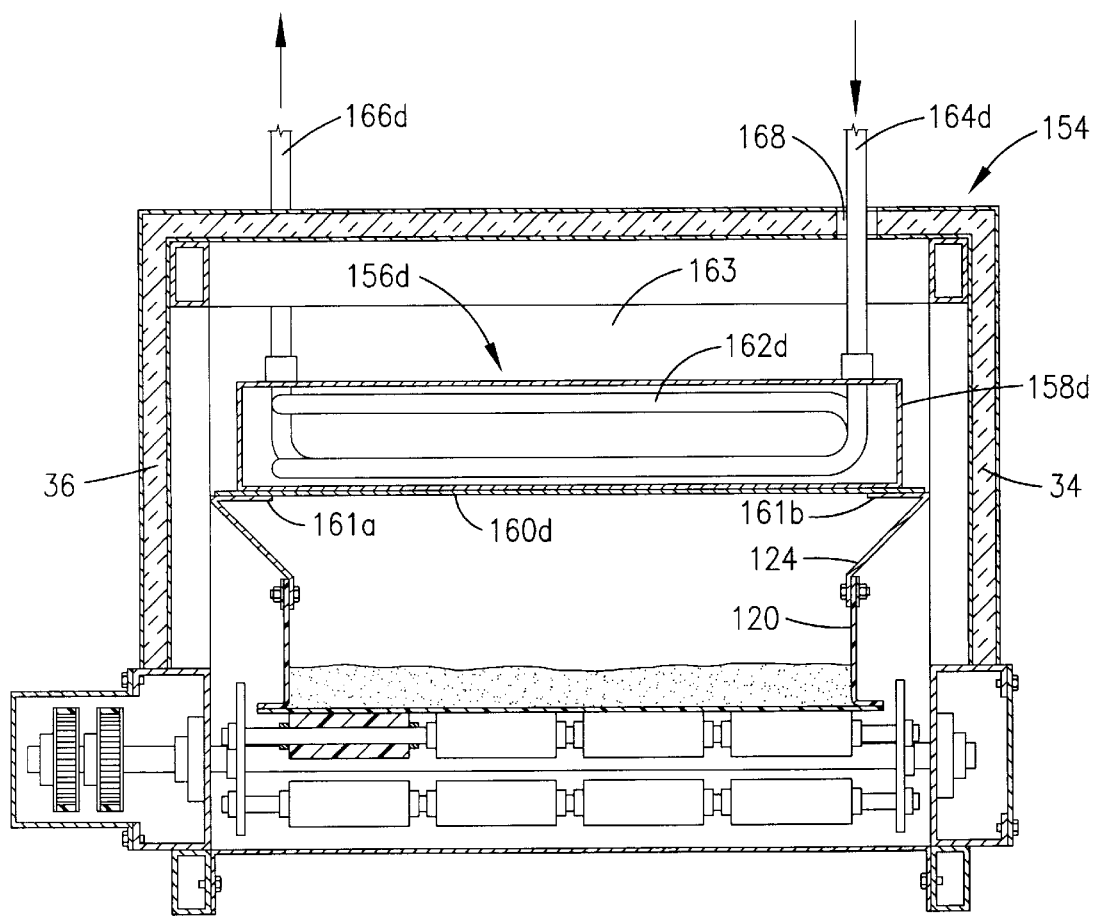
FIG. 13 is a vertical sectional view taken along lines 13—13 of FIG. 12 and depicting the operation of the apparatus utilizing the removable steam coil units of FIG. 12.

FIGS. 12–13 illustrate another agitated bed apparatus 154 which is similar to apparatus 20 illustrated in FIG. 1 except that apparatus 154 is configured to accept slidably removable, material conditioning units 156a–d which can be added or removed as desired for heating, cooling, and/or drying particulate material. Each of units 156a–d comprise metal housings 158a–d respectively mounted on metal plates 160a–d (see FIG. 13). In the embodiment illustrated, each of the units 156a–d is approximately 10 feet long and can be slid into housing 22 through a panel (not shown) on sidewall 34, sidewall 36, endwall 38, or endwall 40. Once positioned within housing 22, plates 160ad rest on braces 161a–b (see FIG. 13). This configuration protects the energy source within units 156a–d from contact with the particulate material 152 and prevents passage of material 152 into chamber 163.

Steam coils 162a–d are positioned within housings 158a–d, respectively. Each of coils 162a–d include respective steam inlets 164a–d and steam outlets 166a–d which pass through openings 168 in wall 30 of housing 22 and transport steam through the coils 162a–d, thus heating, cooling, and/or drying the material 152. The operation of apparatus 154 is as described above with the previous embodiments.

Those skilled in the art will appreciate that units 156a–d can include energy sources other than steam coils 162a–d. For example, units 156a–d can readily be replaced by units which contain infrared heaters (high intensity or otherwise), radiant heat sources, water chillers, direct burners, recirculated air, electric heating elements, or any other heat transferor or heat exchanger. The units would simply be adapted so that the necessary inlets/outlets are aligned with openings 168 within housing 22. Any openings 168 which are not necessary for the particular application can then be blocked or sealed. Thus, the units can be selected and installed as needed for the particular application. For example, if it is necessary to cool the material 152, removable units containing water chillers can be positioned within the apparatus 154 Furthermore, different types of energy sources can be positioned within the same apparatus 154 for different stages of cooling, heating, and/or drying.

Actual drying operations with the present invention has demonstrated that a variety of particulate materials can be rapidly and effectively dried, e.g., grains, soils, composts, peat, sawdust, wood chips, agricultural products (sugar, alfalfa, silage, rice, fruits and nuts).

We claim:

1. An agitated bed apparatus for particulate material and comprising:

an elongated housing presenting a particulate material inlet, a particulate material outlet spaced from said inlet, and structure for exit of moisture from the housing;

an elongated, essentially imperforate, flexible bed located within said housing and extending between said inlet and said outlet, said bed presenting an upper particulate material supporting surface, an opposed lower surface, and a pair of side margins, there being an upstanding skirt member adjacent each of said side margins, said bed and skirt members cooperatively retaining said particulate material during heating and drying thereof; and a series of agitators located below and spaced along the length of said bed and oriented for repeatedly impacting said bed lower surface in order to generate an undulating bed movement serving to elevate and tumble said particulate material on said bed and to move the material along the length of the bed from said inlet toward said outlet.

2. The apparatus of claim 1, further including a material conditioning unit disposed above said bed within said housing.

3. The apparatus of claim 2, said unit comprising a component selected from the group consisting of cooling devices, drying devices, heating devices, and mixtures thereof.

4. The apparatus of claim 2, said conditioning unit being removable from said housing.

5. The apparatus of claim 4, said conditioning unit being slidably removable from said housing.

6. The apparatus of claim 4, further including a plurality of adjacent conditioning units.

7. The apparatus of claim 4, said conditioning unit comprising an infrared heater.

8. The apparatus of claim 4, said conditioning unit comprising a water chiller.

9. The apparatus of claim 1, said bed being mounted within said housing substantially in tension and against translational movement of the bed.

10. The apparatus of claim 9, one end of said bed being fixedly secured to said housing, the other end of said bed being yieldably attached to said housing.

11. The apparatus of claim 1, said bed comprising an endless flexible belt, there being a pair of spaced belt-supporting rollers adjacent opposite ends of the endless belt.

12. The apparatus of claim 1, said agitators being provided along substantially the entire length of said bed.

13. The apparatus of claim 1, said agitators comprising a series of rotatable, multiple-roller beater bar assemblies.

14. The apparatus of claim 13, including a variable speed drive operatively coupled with said beater bar assemblies for rotating said assemblies at different rotational speeds.

15. The apparatus of claim 1, including means for adjusting the inclination of said bed.

16. An agitated bed apparatus for particulate material and comprising:

an elongated housing presenting a particulate material inlet, a particulate material outlet spaced from said inlet, and structure for exit of moisture from the housing;

an elongated flexible bed located within said housing and extending between said inlet and said outlet, said bed presenting an upper particulate material supporting surface, an opposed lower surface, and a pair of side margins, there being an upstanding skirt member adjacent each of said side margins, said bed and skirt members cooperatively retaining said particulate material during heating and drying thereof, a series of agitators located below and spaced along the length of said bed and oriented for repeatedly impacting said bed lower surface in order to generate an undulating bed movement serving to elevate and tumble said particulate material on said bed and to move the material along the length of the bed from said inlet toward said outlet; and a material conditioning unit disposed above said bed within said housing.

17. The apparatus of claim 16, said material conditioning unit comprising a component selected from the group consisting of cooling devices, drying devices, heating devices, and mixtures thereof.

18. The apparatus of claim 16, said conditioning unit being removable from said housing.

19. The apparatus of claim 18, said conditioning unit being slidably removable from said housing.

20. The apparatus of claim 16, further including a plurality of adjacent conditioning units.

21. The apparatus of claim 16, said conditioning unit comprising an infrared heater.

* * * * *